United States Patent [19]

Nelson et al.

[11] Patent Number: 5,470,111
[45] Date of Patent: Nov. 28, 1995

[54] PLASTIC COATING THREAD AND COUPLING ASSEMBLY

[75] Inventors: John M. Nelson; Ray D. Willis, both of Houston, Tex.

[73] Assignee: Tuboscope Vetco International, Inc., Houston, Tex.

[21] Appl. No.: 288,805

[22] Filed: Aug. 12, 1994

[51] Int. Cl.$^6$ ................................................. F16L 15/04
[52] U.S. Cl. ........................ 285/55; 285/351; 285/383; 285/333
[58] Field of Search ............................... 285/55, 333, 383, 285/351, 355

[56] References Cited

U.S. PATENT DOCUMENTS

| | | | |
|---|---|---|---|
| 3,235,291 | 2/1966 | Jacoby | 285/55 |
| 3,253,841 | 5/1966 | Ahmad | 285/55 |
| 3,268,240 | 8/1966 | Gerner | 285/55 |
| 3,307,860 | 3/1967 | Blount et al. | 285/55 |
| 3,339,945 | 9/1967 | McCrory, Jr. et al. | 285/55 |
| 3,472,533 | 10/1969 | Turner | 285/55 |
| 3,479,059 | 11/1969 | Taylor et al. | 285/55 |
| 4,507,842 | 4/1983 | Werner | 285/55 |
| 4,792,160 | 12/1988 | Hwang | 285/351 |
| 4,856,828 | 8/1989 | Kessler et al. | |
| 5,314,209 | 5/1994 | Kuhne | 285/351 |

*Primary Examiner*—Eric K. Nicholson
*Attorney, Agent, or Firm*—Finnegan, Henderson, Farabow, Garrett & Dunner

[57] ABSTRACT

A coupling assembly having an annular coupling with internal threads having a continuous plastic, corrosion-resistant coating. Opposed tubes are provided with a similar internal coating. The tubes have external threads inserted into the coupling with the internal and external threads being in threaded engagement. An annular gasket is provided of rigid material and is mounted between and in sealing engagement with opposed ends of the tubes within the coupling. The gasket has a continuous radial portion extending between the opposed ends of the tubes and in spaced apart relation thereto. O-rings are in sealing engagement with the tubing ends and the continuous radial portion of the gasket. A pair of opposed flanges extend from opposite sides of the continuous radial portion of the gasket and are in sealing contact with an interior surface portion of the tubes.

6 Claims, 1 Drawing Sheet

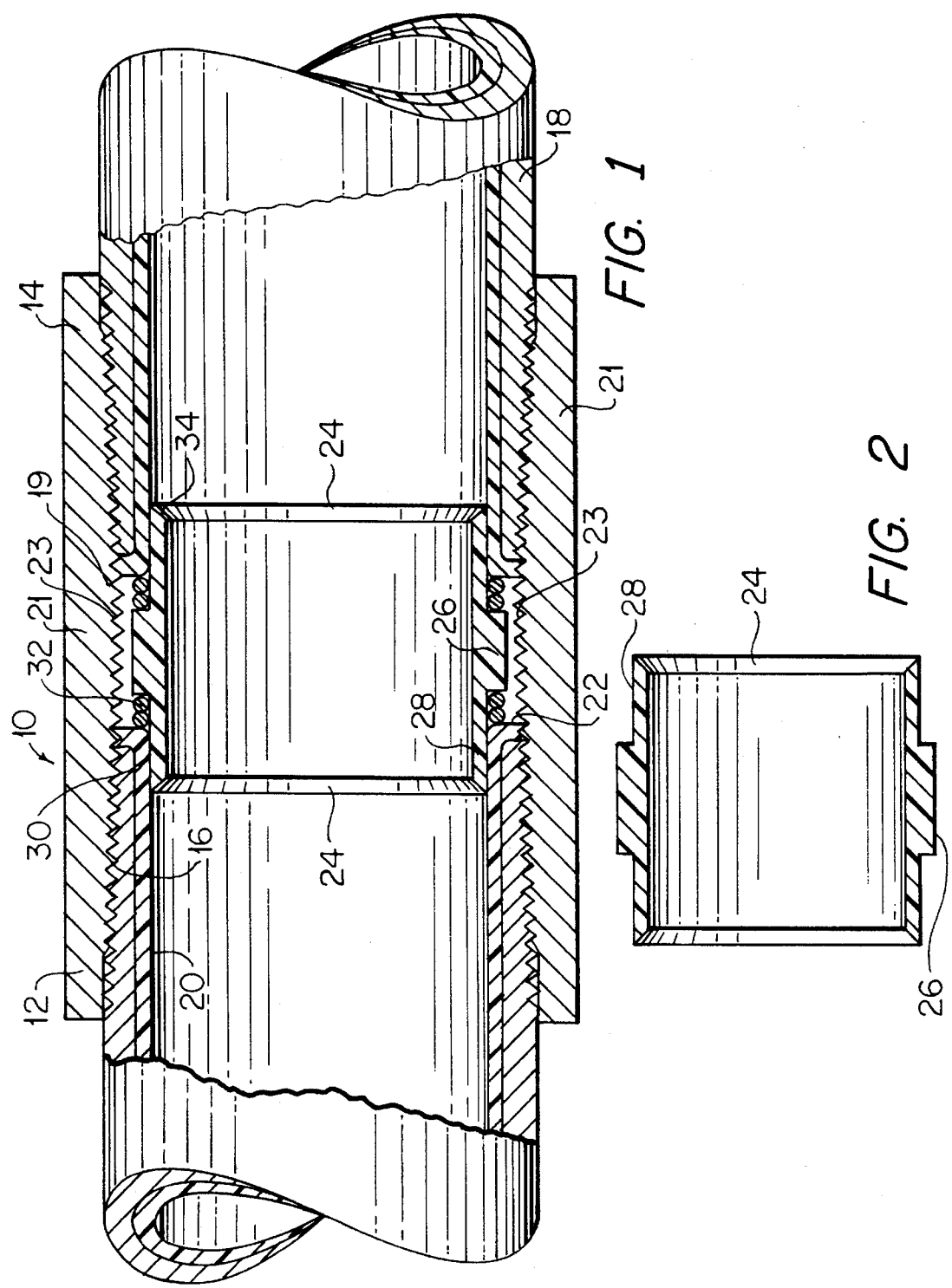

5,470,111

PLASTIC COATING THREAD AND COUPLING ASSEMBLY

BACKGROUND OF THE INVENTION

1. Field of the Invention

The invention relates to a coupling assembly for use in coupling threaded, tubular articles.

2. Description of the Prior Art

In various threaded coupling applications for metal tubular articles, such as in the gas and oil well extraction and injection applications, it is necessary to couple threaded, tubular articles in a manner that ensures a reliable seal between the coupled ends of the tubular articles and in addition protect the tube ends from corrosion. It is typical in applications of this type, to coat the interior surface of the tubular articles, including the nose portion, and the coupling with plastic to protect the interior surfaces of the metal tubing and coupling from corrosion.

During coupling or make-up of the tubing in the field, the corrosion-resistant plastic coating is subject to mechanical damage and removal of portions of the coating, particularly at or near the tubing ends. This coating damage, and additionally the turbulent flow pattern that occurs in this area of the tubular product during use, can result in both abrasion and erosion of the exposed metal along with subsequent corrosion as this exposed metal contacts the corrosive fluid product in the tubing against which the plastic coating was originally intended to protect.

In addition, it is advantageous to uncouple and reuse by subsequent make-up tubular products of this type. Each time the tubing is subjected to additional make-up, the threaded portion of the tubing ends is distorted so that the tubing ends extend a greater distance within the coupling during each additional make-up. This dimensional change may require the use of a gasket insert of different dimensions than used during the initial make-up of the tubing. This adds to the cost and complexity of the make-up operation. In addition, if the dimensions of the insert gasket are not correct, effective sealing will not be achieved. Also, this may result in the tubing ends damaging the gasket during make-up. Specifically, if the gasket dimension is too short, which limits effective contact with both tubing ends, proper protection of the tubing ends will not be achieved. Conversely, if the gasket is too long, it will be distorted during makeup to limit the protection it can afford, reducing the inside diameter at the coupling, and increasing the turbulence of flow through the coupling.

SUMMARY OF THE INVENTION

It is accordingly an object of the present invention to provide a plastic coated threaded coupling assembly, wherein the plastic coating of the tubing of the assembly is protected from mechanical damage and further protecting any end portion of the tubing having coating damage by sealing it against contact with corrosive fluids passing through the coupling.

In addition, the present invention provides sufficient flexibility to permit multiple make-up operations without changing the dimensions of the gasket insert, while providing protection to the tubing ends with respect to damage and corrosion.

Broadly, in accordance with the invention, there is provided a coupling assembly having an annular coupling. Opposed tubes are provided having a continuous plastic, corrosion-resistant coating, and having external threads inserted into the coupling with the internal threads and external threads being in threaded engagement. An annular gasket is provided of rigid material and is mounted between and in sealing engagement with opposed ends of the tubes within the coupling. The gasket has a continuous radial portion extending between the opposed ends of the tubes and spaced apart from each opposed end of the tubes a distance sufficient to receive a plurality of O-rings, each of which are mounted between each of the tubing ends, and the continuous radial portion of the gasket. The O-rings are in sealing engagement with tubing ends and the continuous radial portion of the gasket. A pair of opposed flanges extend from opposite sides of the continuous radial portion of the gasket and into sealing contact with an interior surface portion of the tubes, extending from each opposed end of the tubes and into sealing contact with an exterior surface portion of each of these flanges.

The continuous radial portion of the gasket may have opposed side surfaces each constituting bearing surfaces for each plurality of O-rings upon the application of compressive force to the O-rings by the tube ends. The opposed side surfaces of the continuous radial portion of the gasket may be substantially normal to the exterior surface portion of each of the flanges of the gasket. Each of the O-rings may be contiguous to the exterior surface portion of each of the flanges of the gasket. The flanges of the gasket may have chamfered edges. The internal threads of the annular coupling may have a central portion with a plastic, corrosion-resistant coating in threaded engagement with the external threads of the opposed tubes. The flanges of the gasket may have an outside diameter greater than an inside diameter of the interior surface portion of the tubes at an area of sealing contact with these flanges of the gasket.

BRIEF DESCRIPTION OF THE DRAWINGS

FIG. 1 is cross sectional view of one embodiment of the coupling assembly of the invention; and FIG. 2 is a cross sectional view of the gasket of the coupling assembly of FIG. 1.

DESCRIPTION OF THE PREFERRED EMBODIMENTS

With reference to the drawings, and for the present FIG. 1 thereof, there is shown one embodiment of a coupling assembly in accordance with the invention, designated generally as 10. The coupling assembly 10 has an annular coupling 12 with tapered threads 14 in threaded engagement with corresponding threads 16 on each of opposed, coupled tubes 18 at the chamfer portion 19 thereof. The coupling 12 and tubes 18 may be any conventional alloy, such as carbon steel.

The interior portion of tubes 18 and a center portion 21 of the coupling 12, have a continuous plastic, corrosion-resistant coatings 20 and 23, respectively. Alternately, the coupling 12 may not have this center portion 21 coated with plastic. Between the opposed ends of the tubes 18 is a gasket 24. The gasket 24 is constructed from a rigid material resistant to corrosive attack, such as polyethylene or polypropylene. The gasket 24 is annular with a continuous radial portion 26 with an opposed pair of flanges 28 extending from opposite sides thereof, and into contact with a marginal portion 30, extending from each opposed end 22 of the tubes 18. Between the radial portion 26 of the gasket 24 and the ends 22 of the tubing 18, there is provided two pair of a plurality of O-rings 32 of a resilient or compressible material, such as rubber. The pairs of O-rings 32 are compressed by the ends 22 of the tubes to provide a tight seal between the tubing ends and the gasket 24. In this manner, corrosive media passing through the tubes 18 is prevented from contacting the ends 22 of these tubes and the chamfer portion 19 from which the coating 20 may have been removed by mechanical damage. The ends 34 of the gasket 24 are chamfered to minimize turbulence of the product flow which would increase pressure loss of product passing through the coupling assembly to decrease effective product throughput. In addition, the chamfered gasket ends 34 will also improve the ability to pass standard oil field tools through the coupling assembly.

The tubing ends are threaded into the coupling 12, a threaded distance sufficient to compress the plurality of O-rings 32 to an extent sufficient to provide the desired sealing effect. The use of two pairs of a plurality of O-rings in association with the gasket 24, enables the tube ends to extend greater or lesser distances toward each other, which depends upon distortion caused by reuse of the tubes, while maintaining effective sealing.

As may be seen from this embodiment of the invention, the chamfer ends 34 of the gasket 24 minimize turbulence of product flow to improve the effectiveness of the seal and prevent damage to the interior corrosion resistance plastic coating of the tubing and in addition improve gasket throughput. The use of two pairs of a plurality of O-rings in association with the marginal portion 26 of the gasket 24, permits effective make-up of both new and used tubing by accommodating variations in the penetration of the tubing ends within the coupling, while maintaining an effective seal. The marginal portion 30 of the tubing, which is in sealing contact with the flanges of the gasket, provides for sealing and protection of any portion of the tubing ends that may have experienced coating damage and in this manner provides protection from corrosion of these portions of the tubing. An additional corrosion barrier is provided by the engagement between plastic coating 23 of the coupling with the plastic coating 20 of the chamfered portion 19 of the tubing ends.

What is claimed is:

1. A coupling assembly comprising an annular coupling having internal threads having a central portion having a plastic corrosion-resistant coating and opposed tubes having a continuous plastic, corrosion-resistant coating and having external threads inserted into said coupling with said internal threads, including said central portion thereof, and said external threads being in threaded engagement to produce a seal and a corrosion barrier at said central portion of said annular coupling, an annular gasket of rigid material mounted between and in sealing engagement with opposed ends of said tubes within said coupling, said gasket having a continuous radial portion extending between said opposed ends of said tubes and spaced apart from each said opposed ends of said tubes a distance sufficient to receive a plurality of O-rings mounted between each said tubing opposed ends and said continuous radial portion of said gasket and in sealing engagement with each said plurality of O-rings, a pair of opposed flanges extending from opposite sides of said continuous radial portion of said gasket and into sealing contact with an interior surface portion of said tubes extending from each said opposed end of said tubes.

2. The coupling assembly of claim 1, wherein said continuous radial portion of said gasket has opposed side surfaces each constituting bearing surfaces for each said plurality of O-rings resulting from application of compressive force thereto by said tube ends.

3. The coupling assembly of claim 2, wherein said opposed side surfaces of said continuous radial portion of said gasket are substantially normal to said exterior surface portion of each of said flanges.

4. The coupling assembly of claim 3, wherein each said plurality of O-rings is contiguous to said exterior surface portion of each of said flanges of said gasket.

5. The coupling assembly of claims 1, 2, 3, or 4, wherein said flanges of said gasket have chamfered edges.

6. The coupling assembly of claim 1, wherein said flanges of said gasket have an outside diameter greater than an inside diameter of said interior surface portion of said tubes at an area of said sealing contact therewith.

\* \* \* \* \*